United States Patent
Kudo et al.

(10) Patent No.: US 6,759,469 B2
(45) Date of Patent: Jul. 6, 2004

(54) BUTYL RUBBER COMPOSITION

(75) Inventors: Masashi Kudo, Kanagawa (JP); Takashi Amemiya, Kanagawa (JP); Arata Iida, Aichi (JP)

(73) Assignee: NOK Corporation, Tokyo (JP)

( * ) Notice: Subject to any disclaimer, the term of this patent is extended or adjusted under 35 U.S.C. 154(b) by 189 days.

(21) Appl. No.: 10/019,636

(22) PCT Filed: May 15, 2001

(86) PCT No.: PCT/JP01/04010

§ 371 (c)(1),
(2), (4) Date: Dec. 28, 2001

(87) PCT Pub. No.: WO01/92411

PCT Pub. Date: Dec. 6, 2001

(65) Prior Publication Data

US 2003/0088013 A1 May 8, 2003

(30) Foreign Application Priority Data

May 30, 2000 (JP) ........................................ 2000-159508
Sep. 18, 2000 (JP) ........................................ 2000-281091

(51) Int. Cl.[7] .............................. C08J 3/00; C08K 3/04; C08L 57/02
(52) U.S. Cl. ........................ 524/495; 524/496; 524/499
(58) Field of Search ................................. 524/495, 496, 524/499

(56) References Cited

U.S. PATENT DOCUMENTS 6,407,166 B1 * 6/2002 Wang et al.

FOREIGN PATENT DOCUMENTS

| JP | 62-273279 | 11/1987 |
|---|---|---|
| JP | 2-060952 | 3/1990 |
| JP | 4-120186 | 4/1992 |
| JP | 5-263941 | 10/1993 |
| JP | 6-345915 | 12/1994 |
| JP | 9-3278 | 1/1997 |
| JP | 1-1293075 | 10/1999 |
| JP | 0-170656 | 6/2000 |
| WO | WO 97/23561 | 7/1997 |

* cited by examiner

Primary Examiner—Patrick D. Niland
(74) Attorney, Agent, or Firm—Butzel Long

(57) ABSTRACT

A butyl rubber composition, which comprises 100 parts by weight of butyl rubber and 30 to 150 parts be weight of carbon black having a CTAB specific surface area of 30 to 100 m$^2$/g and preferably further contains 10 to 100 parts by weight of a flat filler having an average particle size of 1 to 40 $\mu$m and an aspect ratio of 5 or more and 0.05 to 5 parts by weight of a coupling agent of organometallic compound is provided. The butyl rubber composition can give vulcanization molded products capable of effectively sealing a carbon dioxide refrigerant without generation of blisters, etc. therein.

16 Claims, No Drawings

 …

BUTYL RUBBER COMPOSITION

TECHNICAL FIELD

The present invention relates to a butyl rubber composition, and more particularly to a butyl rubber composition for effective use as molding materials of sealing materials for air conditioners using carbon dioxide as a refrigerant.

BACKGROUND ART

Heretofore, flon-series gases have been used as air conditioner refrigerants, and it is known that the flon-series gases can destroy global environments due to their chemical structures, for example, by destroying the ozonosphere or by warming the earth's atmosphere. Thus, studies have been extensively made on earth-friendly refrigerants, one of which is carbon dioxide ($CO_2$). $CO_2$ is highly soluble in polymer materials, resulting in permeation into sealing materials or blister generation due to changes in pressure in the use circumstances, etc. It is in the present status that no sealing materials capable of confining $CO_2$ therein have been found yet.

DISCLOSURE OF THE INVENTION

An object of the present invention is to provide a butyl rubber composition capable of giving vulcanization-molded products capable of effectively confining a carbon dioxide refrigerant therein without blister generation.

The object of the present invention can be attained by a butyl rubber composition, which comprises 100 parts by weight of butyl rubber and 30 to 150 parts by weight of carbon black having a CTAB specific surface area (according to ASTM D 3765) of 30 to 100 $m^2$/g. It is preferable that the butyl rubber composition contains 10 to 100 parts by weight of a flat filler having as an average particle size of 1 to 40 $\mu$m and an aspect ratio of 5 or more and 0.05 to 5 parts by weight of a coupling agent of organometallic compound.

Butyl rubber is a copolymer of isobutylene and isoprene, where at most 3% by mole of isoprene is copolymerized. In the present invention, it is preferable to use a copolymer containing about 2% by mole of isoprene.

Carbon black having a CTAB (cetyltrimethyl ammonium bromide) specific surface area of 30 to 100 $m^2$/g, preferably 35 to 95 $m^2$/g, is contained in butyl rubber in an amount of 30 to 150 parts by weight, preferably 50 to 130 parts by weight, on the basis of 100 parts by weight of butyl rubber. When carbon black having a CTAB specific surface area of more than 100 $m^2$/g is used, the reinforcing effect is too strong, resulting in increased rubber compound viscosity or dispersion failure, whereas carbon black having a CTAB specific surface area of less than 30 $m^2$/g is used, no practical level reinforcing effect is obtainable and bubbles are formed upon contact with the $CO_2$ refrigerant. This is also true in the case of a lower blending proportion than 30 parts by weight as in the case of a lower CTAB specific surface area of 30 $m^2$/g, whereas in the case of a higher blending proportion than 150 parts by weight, not only kneading will be difficult to conduct due to the resulting increased rubber compound viscosity but also very hard vulcanization molded products will be produced.

When a flat filler is used together with carbon black having such specific surface areas, shieldability against the carbon dioxide refrigerant can be improved. The flat filler includes, for example, clay, mica (mica powder), graphite, molybdenum disulfide, etc., and is used in a proportion of 10 to 100 parts by weight, preferably 30 to 80 parts by weight, to 100 parts by weight of butyl rubber.

The flat filler having an average particle size of 1 to 40 $\mu$m, preferably 5 to 30 $\mu$m, and an aspect ratio of 5 or more, preferably 10 to 30, can be used. When the average particle size is less than 1 $\mu$m or the aspect ratio is less than 5, no improvement of the refrigerant shieldability is observable, whereas when the average particle size is more than 40 $\mu$m, not only the practical level reinforcing effect cannot be obtained, but also blister generation appears upon contact with the carbon dioxide refrigerant. When the blending proportion is less than 10 parts by weight, not improvement of the refrigerant shieldability is observable. When the blending proportion is not less than 100 parts by weight, blister generation appears upon contact with the carbon dioxide refrigerant, as in the case where the larger average particle size is used.

In the case of using a flat filler for an improvement of the refrigerant shieldability, it is necessary to use 0.05 to 5 parts by weight, preferably 0.1 to 3 parts by weight, of a coupling agent of organometallic compound at the same time. When the blending proportion is less than 0.05 parts by weight, no coupling effect is observable, and blister generation appears upon contact with the carbon dioxide refrigerant. On the other hand, when the blending proportion is more than 5 parts by weight, cross-linking inhibition appears and the compression set characteristic is deteriorated.

Coupling agent of organometallic compound includes, for example, silane coupling agents such as vinyltrimethoxysilane, vinyltriethoxysilane, vinyl tris(2-methoxyethoxy)silane, vinyl-trichlorosilane, γ-glycidoxypropyltrimethoxysilane, γ-glycidoxypropyltriethoxysilane, γ-glycidoxypropylmethyl-diethoxysilane, γ-methacryloxypropyltrimethoxysilane, γ-methacryoloxypropyltri-ethoxysilane, γ-methacryloxypropylmethyldimethoxysilane, γ-methacryoxypropylmethyldiethoxysilane, etc.; titan coupling agents, such as isopropyltriisostearoyl titanate, isopropyltris(dioctylpyrophosphate) titanate, isopropyltri(N-aminoethyl-aminoethyl) titanate, tetraoctyl bis (ditridecylphosphite) titanate, bis(dioctylpyrophosphate) oxyacetate titanate, bis(dioctylpyrophosphate) ethylene titanate, etc.; and aluminum coupling agents such as aluminum ethylate, aluminum isopropylate, aluminum isopropylate mono-sec-butyrate, aluminum sec-butyrate, aluminum alkylacetoacetate diisopropylate, aluminumtrisacetyl acetonate, aluminum alkylacetoacetate, etc., which can be used alone or in cominiation of two or more.

Any of such cross-linking agents as sulfur (donor), morpholine, quinoid, halogenated alkylphenol formaldehyde resin, etc. can be used, so long as they are applicable to butyl rubber. Butyl rubber composition can contain any other appropriate additives than those mentioned above, for example, a reinforcing agent such as white carbon, etc., a filler such as talc, clay, graphite, calcium silicate, etc., a processing aid such as stearic acid, palmitic acid, paraffin wax, etc., an acid receptor such as zinc oxide, magnesium oxide, etc., an antioxidant, a plasticizer, etc., if desired.

The composition can be prepared by kneading through a mixer such as Intermixer, a kneader, Bambury mixer, etc., or open rolls. Vulcanization thereof can be carried out by heating at about 150° C. to about 200° C. for about 3 to about 60 minutes through an injection molding machine, a compression molding machine, a vulcanization press, etc. Oven vulcanization (secondary vulcanization) can be carried out, if desired, by heating at about 120° to about 200° C. for about 1 to about 24 hours.

BEST MODES FOR CARRYING OUT THE INVENTION

The present invention will be described below, referring to Examples.

EXAMPLES 1

| | |
|---|---|
| Butyl rubber (Butyl 365, product made by Japan Synthetic Rubber Co., Ltd; isoprene content: 2 mol. %) | 100 parts by weight |
| Carbon black (CTAB specific surface area: 50 m$^2$/g) | 80 parts by weight |
| Zinc oxide | 5 parts by weight |
| Halogenated alkylphenol formaldehyde resin | 5 parts by weight |

The foregoing components were kneaded through a kneader and open rolls, and the resulting kneaded product was subjected to press vulcanization at 170° C. for 30 minutes and oven vulcanization (secondary vulcanization) at 140° C. for 10 hours to produce a vulcanized sheet, 150× 150×2 mm.

The vulcanized sheet was then subjected to measurement of normal state physical properties according to JIS K-6253 and JIS K-6251 and also to dipping in liquid $CO_2$ at 25° C. for 24 hours, followed by heating at 150° C. for one hour and visual observation of the presence of surface blister generation.

EXAMPLE 2

In Example 1, 70 parts by weight of carbon black having a CTAB specific surface area of 80 m$^2$/g was used as carbon black.

COMPARATIVE EXAMPLE 1

In Example 1, 150 parts by weight of carbon black having a CTAB specific surface area of 10 m$^2$/g was used as carbon black.

COMPARATIVE EXAMPLE 2

In Example 1, 50 parts by weight of carbon black having a CTAB specific surface of 120 m$^2$/g was used as carbon black.

COMPARATIVE EXAMPLE 3

In Example 1, 20 parts by weight of carbon black having a CTAB specific area of 90 m$^2$/g was used as carbon black.

COMPARATIVE EXAMPLE 4

In Example 1, 170 parts by weight of carbon black having a CTAB specific surface area of 30 m$^2$/g was used as carbon black.

Results of measurement and evaluation in the foregoing Examples and Comparative Examples are shown in the following Table 1. In Comparative Examples 2 and 4, kneading itself was found impossible.

TABLE 1

| Items of measurement and evaluation | Ex.1 | Ex.2 | Comp.Ex.1 | Comp.Ex.3 |
|---|---|---|---|---|
| [Normal state physical properties] | | | | |
| Hardness (Durometer A) | 81 | 80 | 78 | 60 |
| Tensile strength (MPa) | 15.3 | 16.4 | 7.3 | 8.9 |
| Elongation (%) | 220 | 270 | 210 | 200 |
| [$CO_2$ resistance] | | | | |
| Presence of blister Generation | None | None | Occurred | Occurred |

EXAMPLE 3

| | |
|---|---|
| Butyl rubber (Butyl 365) | 100 parts by weight |
| Carbon black (CTAB specific surface area: 50 m$^2$/g) | 60 parts by weight |
| Flat, graphite (average particle size: 10 μm; aspect ratio : 20) | 30 parts by weight |
| γ-Glyidoxypropyltrimethoxysilane | 1 parts by weight |
| Zinc oxide | 5 parts by weight |
| Halogenated alkylphenol formaldehyde resin | 5 parts by weight |

The foregoing components were subjected to kneading, vulcanization, measurement and evaluation in the same manner as in Example 1. In the measurement, compression set (120° C. for 70 hours) according to JIS K-6262 and $CO_2$ shieldability (70° C.) according to ASTM D-1434 were determined besides the normal state physical properties and $CO_2$ resistance.

EXAMPLE 4

In Example 3, 50 parts by weight of carbon black having a CTAB specific surface area of 80 m$^2$/g was used as carbon black.

EXAMPLE 5

In Example 3, the same amount of flat graphite having an average particle size of 2 μm and an aspect ratio of 10 was used as flat graphite.

EXAMPLE 6

In Example 3, the same amount of isopropyltriisostearoyl titanate was used in place of γ-glycidoxypropyltrimethoxy-silane.

EXAMPLE 7

In Example 3, the same amount of aluminum alkyl acetoacetate was used in place of γ-glycidoxypropyltrimethoxy-silane.

Results of measurement and evaluation in the foregoing Examples 3 to 7 are shown in the following Table 2.

TABLE 2

| Items of measurement and evaluation | Ex.3 | Ex.4 | Ex.5 | Ex.6 | Ex.7 |
|---|---|---|---|---|---|
| [Normal state physical properties] | | | | | |
| Hardness (Durometer A) | 80 | 81 | 83 | 80 | 80 |

TABLE 2-continued

| Items of measurement and evaluation | Ex.3 | Ex.4 | Ex.5 | Ex.6 | Ex.7 |
|---|---|---|---|---|---|
| Tensile strength (MPa) | 14.3 | 15.0 | 15.1 | 14.5 | 14.7 |
| Elongation (%) | 260 | 240 | 220 | 260 | 250 |
| [Compression set] | | | | | |
| 120° C. for 70 hours (%) | 27 | 26 | 25 | 28 | 27 |
| [$CO_2$ shieldability] | | | | | |
| Permeation coefficient (cc · mm/m$^2$ · 24 hr · atm) | 700 | 750 | 850 | 700 | 700 |
| [$CO_2$ resistance] | | | | | |
| Presence of blister Generation | none | none | none | none | none |

COMPARATIVE EXAMPLE 5

In Example 3, 120 parts by weight of carbon black having a CTAB specific surface area of 10 m$^2$/g was used as carbon black.

COMPARATIVE EXAMPLE 6

In Example 3, 40 parts by weight of carbon black having a CTAB specific surface area of 120 m$^2$/g was used as carbon black.

COMPARATIVE EXAMPLE 7

In Example 3, 15 parts by weight of carbon black having a CTAB specific surface area of 90 m$^2$/g was used as carbon black.

COMPARATIVE EXAMPLE 8

In Example 3, 160 parts by weight of carbon black having a CTAB specific surface area of 30 m$^2$/g was used as carbon black.

COMPARATIVE EXAMPLE 9

In Example 3, the same amount of flat graphite having an average particle size of 0.5 μm and an aspect ratio of 10 was used as flat graphite.

COMPARATIVE EXAMPLE 10

In Example 3, the same amount of flat mica having an average particle size of 50 μm and an aspect ratio of 20 was used in place of the flat graphite.

COMPARATIVE EXAMPLE 11

In Example 3, the same amount of spherical clay having an average particle size of 10 μm and an aspect ratio of 1 was used in place of the flat graphite.

COMPARATIVE EXAMPLE 12

In Example 3, the amount of carbon black and that of flat graphite were changed to 75 parts by weight and 5 parts by weight, respectively.

COMPARATIVE EXAMPLE 13

In Example 3, the amount of carbon black and that of flat graphite were changed to 30 parts by weight and 120 parts by weight, respectively.

COMPARATIVE EXAMPLE 14

In Example 3, no γ-glycidoxypropyltrimethoxysilane was used.

COMPARATIVE EXAMPLE 15

In Example 3, the amount of γ-glycidoxypropyltrimethoxy-silane was changed to 10 parts by weight.

Results of measurement and evaluation in the foregoing Comparative Examples 5 to 15 are shown in the following Table 3. In Comparative Examples 6 and 8, kneading itself was found impossible.

TABLE 3

| Items of measurement and evaluations | Comparative Example No. | | | | | | | | |
|---|---|---|---|---|---|---|---|---|---|
| | 5 | 7 | 9 | 10 | 11 | 12 | 13 | 14 | 15 |
| [Normal state physical properties] | | | | | | | | | |
| Hardness (Durometer A) | 82 | 79 | 81 | 80 | 82 | 81 | 79 | 80 | 77 |
| Tensile strength (MPa) | 8.7 | 12.4 | 15.6 | 13.5 | 15.1 | 15.9 | 6.9 | 14.5 | 12.7 |
| Elongation(%) | 270 | 290 | 240 | 290 | 270 | 260 | 190 | 280 | 460 |
| [Compression set] | | | | | | | | | |
| 120° C. for 70 hours (%) [$CO_2$ Shieldability] | 24 | 29 | 26 | 32 | 25 | 21 | 35 | 25 | 68 |
| Permeation Coefficient (cc · mm/m$^2$ · 24 hr · atm) [$CO_2$ resistance] | 600 | 850 | 1200 | 550 | 1400 | 1300 | 350 | 700 | 750 |
| Presence of blister generation | occurred | occurred | none | occurred | none | none | occurred | occurred | none |

In Examples 1 and 2 and Comparative Examples 1 and 3, the $CO_2$ shieldability (permeation coefficient) was found 1,400, 1,400, 1,200 and 1,600 (cc·mm/m$^2$·24·hr·atm), respectively.

INDUSTRIAL APPLICABILITY

The present butyl rubber composition comprises butyl rubber and carbon black having a specific CTAB specific surface area and can give vulcanization molded products showing a distinguished sealability against carbon dioxide without generation of blisters, etc. against carbon dioxide refrigerant. Particularly, when a flat filler with specific properties and a coupling agent of organometallic compound are contained together, a much better shieldability against the carbon dioxide refrigerant can be obtained.

The present butyl rubber composition showing such distinguished characteristics can be suitably used as molding materials for sealing materials such as O-rings, gaskets, packings, etc. for use in air conditioners, for example, squeeze packings (O-rings, X-rings, D-rings, etc.) or as molding materials for sealing materials for refrigerator oil (polyalkylene glycol, etc.) applicable to a carbon dioxide refrigerant.

What is claimed is:

1. A butyl rubber composition for use as a molding material for sealing of a carbon dioxide refrigerant which comprises 100 parts by weight of butyl rubber and 30 to 150 parts by weight of carbon black having a CTAB (cetyltrimethylammonium bromide) specific surface area of 30 to 100 m$^2$/g.

2. A butyl rubber composition according to claim 1, wherein 10 to 100 parts by weight of a flat filler having an average particle size of 1 to 40 μm and an aspect ratio of 5 or more and 0.05 to 5 parts by weight of a coupling agent of organometallic compound are further contained.

3. A butyl rubber composition according to claim 1 for use as a molding material for use in carbon dioxide.

4. A butyl rubber composition according to claim 3 for use as a molding material for air conditioner sealing materials.

5. A butyl rubber composition according to claim 4 for use as a molding material for air conditioner squeeze packings.

6. A butyl rubber composition according to claim 2 for use as a molding material for use in carbon dioxide.

7. A butyl rubber composition according to claim 6 for use as a molding material for air conditioner sealing materials.

8. A butyl rubber composition according to claim 7 for use as a molding material for air conditioner squeeze packings.

9. A sealing material for a carbon dioxide refrigerant molded from the butyl rubber composition of claim 1.

10. A sealing material according to claim 9, wherein the sealing material is a material for air conditioner seals.

11. A sealing material according to claim 10, wherein the sealing material is a material for air conditioner squeeze packings.

12. A butyl rubber composition formulated so that carbon dioxide is substantially non-soluble in the composition, which butyl rubber composition consists essentially of 100 parts by weight of butyl rubber and 30 to 150 parts by weight of carbon black having a CTAB (cetyltrimethylammonium bromide) specific surface area of 30 to 100 m$^2$/g.

13. A butyl rubber composition according to claim 12, further comprising a filler material.

14. A butyl rubber composition according to claim 13, further comprising an organometallic coupling agent.

15. A butyl rubber composition according to claim 14, further comprising a cross-linking agent.

16. A carbon dioxide resistant sealing element that comprises butyl rubber composition which includes 100 parts by weight of butyl rubber and 30 to 150 parts by weight of carbon black having a CTAB (cetyltrimethylammonium bromide) specific surface area of 30 to 100 m$^2$/g.

* * * * *

UNITED STATES PATENT AND TRADEMARK OFFICE
CERTIFICATE OF CORRECTION

PATENT NO.        : 6,759,469 B2
APPLICATION NO.   : 10/019636
DATED             : July 6, 2004
INVENTOR(S)       : Masashi Kudo, Takashi Amemiya and Arata Iida It is certified that error appears in the above-identified patent and that said Letters Patent is hereby corrected as shown below:

On the title page Item [73], an additional Assignee name should be added, --Denso Corporation.--

The Assignee names should read -- NOK Corporation and Denso Corporation.--

Signed and Sealed this

Sixteenth Day of October, 2007

JON W. DUDAS
*Director of the United States Patent and Trademark Office*